(12) United States Patent
Martin et al.

(10) Patent No.: US 8,409,644 B2
(45) Date of Patent: Apr. 2, 2013

(54) MICROWAVABLE REFRIGERATED SCRAMBLED EGGS AND PROCESS

(75) Inventors: Aaron K Martin, Albertville, MN (US); Robert Ralph Prochnow, Dellwood, MN (US); Scott A. Woodward, Ramsey, MN (US)

(73) Assignee: Cargill, Incorporated, Wayzata, MN (US)

( * ) Notice: Subject to any disclaimer, the term of this patent is extended or adjusted under 35 U.S.C. 154(b) by 474 days.

(21) Appl. No.: 12/758,325

(22) Filed: Apr. 12, 2010

(65) Prior Publication Data

US 2011/0250323 A1  Oct. 13, 2011

(51) Int. Cl.
*A23L 1/32* (2006.01)

(52) U.S. Cl. ........ 426/107; 426/614; 426/103; 426/293; 426/302; 426/305; 426/330.1; 426/658; 426/661; 426/94; 426/578; 426/300

(58) Field of Classification Search .................. 426/614, 426/103, 293, 302, 305, 330.1, 658, 661, 426/94, 107, 578, 300
See application file for complete search history.

(56) References Cited

U.S. PATENT DOCUMENTS

| 2,504,869 | A | * | 4/1950 | Noyes | 426/68 |
|---|---|---|---|---|---|
| 4,469,708 | A | * | 9/1984 | Rapp et al. | 426/103 |
| 6,391,371 | B1 | * | 5/2002 | Bhatia et al. | 426/614 |
| 6,413,572 | B1 | * | 7/2002 | Knipper et al. | 426/614 |
| 6,475,550 | B2 | * | 11/2002 | Knipper et al. | 426/614 |
| 6,524,638 | B2 | * | 2/2003 | Knipper et al. | 426/614 |
| 6,814,999 | B2 | * | 11/2004 | Knipper et al. | 426/614 |
| 7,241,469 | B2 | * | 7/2007 | Mathews | 426/614 |
| 2009/0206074 | A1 | * | 8/2009 | Schneider et al. | 219/730 |

* cited by examiner

*Primary Examiner* — Anthony Weier

(57) ABSTRACT

A microwavable, refrigerated scrambled egg composition. The composition includes a first component that is frozen precooked egg portions. At least about 50% by weight of the frozen egg portions are pieces that are at least about ½ inch in one dimension. The second component is a slurry including pasteurized liquid egg and pregelatinized modified food starch. The precooked egg portions are from about 50% to about 85% by weight of the total scrambled egg composition and the slurry is from about 15% to about 50% by weight of the total scrambled egg composition. Processes for making and methods of using the microwavable, refrigerated scrambled egg composition are also provided.

22 Claims, 3 Drawing Sheets

US 8,409,644 B2

MICROWAVABLE REFRIGERATED SCRAMBLED EGGS AND PROCESS

FIELD OF THE INVENTION

The present invention relates to a means of manufacturing and formulating a scrambled egg composition that is stored in a refrigerator and preferably heated by a microwave oven.

BACKGROUND OF THE INVENTION

Scrambled egg products are highly valued as a food source, due to their nutrition value and particularly in view of their flavor, mouth feel and other organoleptic qualities. There are different styles of preparation of scrambled eggs. It is possible, for example to simply bake or fry the eggs to form a solid mass that is in fact edible. A more tender and generally organoleptically desirable style of scrambled eggs is the so called "French-style scrambled egg," wherein the eggs are cooked slowly and gently, to form a fluffy, moist texture that is not overcooked. When not properly prepared, however, scrambled eggs can be a disappointment.

Another degree of complexity is introduced when the eggs are provided in a ready-to-heat environment. For example, eggs have been pre-scrambled, packaged and frozen for later reheating. However, when the cooked eggs are frozen, ice crystals can form, and water will separate from the eggs with adverse effects. A proposed solution for the problems associated with provided precooked, frozen scrambled eggs is described in U.S. Patent Application No. 2005/0202150 and U.S. Patent Application No. 2005/0202151, wherein a water-absorbent thickener is distributed throughout the egg based material. Eggs have long been provided in a storage-stable liquid form, for example as Sunny Fresh® ESL® Products (commercially available from Cargill, Incorporated) or Egg Beaters™ liquid egg substitutes, and similar products. While these have the convenience of being storage stable under refrigeration as a liquid, they require that the person responsible to prepare the food have both time and skill in preparation of eggs to form the desired egg product.

While the consumer demands excellence in organoleptic qualities of the food they consume, there is an equally strong demand for convenience in both storage and preparation. Microwave cooking presents significant advantages in convenience of preparation, but it is exceptionally difficult to meet food quality standards when using this form of heating. The disadvantages of microwave heating have been widely experienced, mostly in that the final microwaved food product tends to have a dry, tough and chewy texture, particularly on the perimeter of the food product.

SUMMARY OF THE INVENTION

The present invention provides a microwavable, refrigerated scrambled egg composition. The composition comprises a first component that is frozen precooked egg portions. At least about 50% by weight of the frozen egg portions are pieces that are at least about ½ inch in one dimension.

The second component is a slurry comprising pasteurized liquid egg and pregelatinized modified food starch. The precooked egg portions are from about 50% to about 85% by weight of the total scrambled egg composition and the slurry is from about 15% to about 50% by weight of the total scrambled egg composition.

The scrambled egg composition can be provided in convenient microwaveable packages.

The present invention also provides a process for preparing the scrambled egg composition described above, comprising:
a) providing frozen precooked egg portions at least about 50% by weight of the frozen egg portions being pieces that are at least about ½ inch in one dimension;
b) preparing a slurry comprising pasteurized liquid egg and pregelatinized modified food starch,
c) mixing the precooked egg portions and the slurry together to provide a scrambled egg composition.

The scrambled egg product as described herein provides excellent manufacturing efficiencies and ease of preparation for the ultimate customer, while at the same time providing a very satisfying eating experience. More specifically, the composition may be assembled using ingredients that are very adaptable to large scale production operations, while at the same time having the appearance of being a hand-made product. The product is easy to store, and provides refrigerator convenience to the supplier and consumer alike. The consumer appreciates both the convenience of the product in terms of serving size and portability, and in particular the ease of preparation of the food product. The scrambled egg product can be heated by any technique suitable for providing a cooked egg product. Because the product is provided in an convenient, pre-prepared and packaged format, the product is easy for the consumer to prepare using any desired technique. The resulting cooked scrambled egg product is very moist and exhibits a soft texture that is unexpected, particularly when heated in a microwave oven.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated in and constitute a part of this application, illustrate several aspects of the invention and together with a description of the embodiments serve to explain the principles of the invention. A brief description of the drawings is as follows.

DETAILED DESCRIPTION OF PRESENTLY PREFERRED EMBODIMENTS

Figure 1:
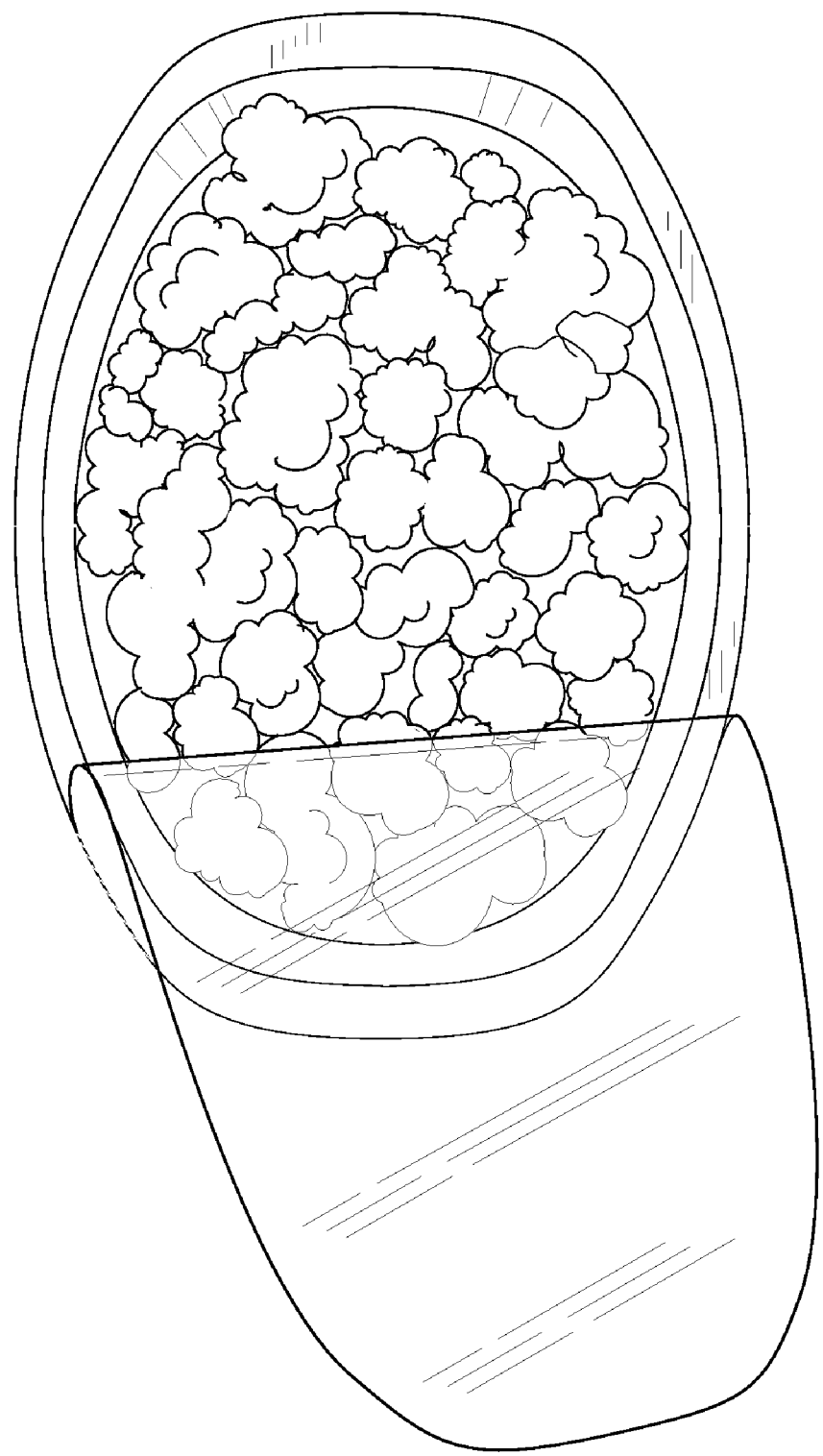
FIG. 1 is photograph of an egg product provided in a microwavable tray package.

The embodiments of the present invention described below are not intended to be exhaustive or to limit the invention to the precise forms disclosed in the following detailed description. Rather a purpose of the embodiments chosen and described is so that the appreciation and understanding by others skilled in the art of the principles and practices of the present invention can be facilitated.

The first component of the microwavable, refrigerated scrambled egg composition is frozen precooked egg portions. These portions, in combination with the slurry as described below, provide varied texture and visual appeal to the food product after cooking. While not being bound by theory, it is believed that the provision of these cooked portions initially in the frozen state during mixing of the composition provides a particular textural benefit at the interface of the materials. It has been observed that products prepared using frozen precooked egg portions exhibit superior organoleptic properties as compared to like products prepared using unfrozen precooked egg portions. The frozen precooked portions are advantageously provided in sizes large enough to provide a perceptible texture and visual distinction. At least about 50% by weight of the frozen egg portions are pieces that are at least about ½ inch in one dimension. In an embodiment of the present invention the frozen egg portions have a smallest dimension, and at least about 50% by weight of the frozen egg portions are pieces that are at least about ½ inch in the smallest dimension. In another embodiment, the frozen egg portions have a smallest dimension, and at least about 50%, or alternatively 75%, by weight of the frozen egg portions are pieces that are from about ½ inch to about 1 inch in the smallest dimension.

Preferably, all of the frozen precooked egg portions are provided in a size large enough to be readily perceptible to the consumer, so that the desired texture and visual benefits are apparent. In a preferred embodiment, less than about 5% by weight of the frozen precooked egg portions are provided by pieces small enough to pass through a U.S. standard No. 7 sieve screen with a nominal sieve opening of 2.8 mm. The frozen precooked egg portions may be provided in any desired configuration. In an embodiment, the frozen egg portions are uniform in size and shape. In another embodiment, the frozen egg portions are non-uniform in size and shape.

The frozen precooked egg portions may be prepared by first cooking the egg, bulk freezing the egg and then cutting, chopping, slicing or otherwise dividing the egg into the desired piece size. In an embodiment, the frozen precooked egg portions are prepared by pouring an uncooked egg composition into cooking trays divided into separate portions having random or uniform sizes and shapes, and cooking the composition to provide portions in the desired final size and shape.

Preferably, the frozen egg portions are quick frozen in an Individually Quick Frozen ("IQF") process, meaning that they are cooked, provided in pieces sizes suitable for rapid freezing, and then are rapidly frozen by exposure to a super-cooled material, such as a gas or liquid, to freeze the product. Other types of freezers, such as mechanical freezers, air impingement freezers or other suitable freezers are capable of providing IQF frozen egg portions. This embodiment provides the egg portion in the final size without a further comminuting operation, which both provides the desired texture and water content of the frozen egg product and provides an efficient manufacture of this component without undue generation of undesirable fines.

Fast freezing, as preferred in the present invention, normally provides a very high quality product by reducing moisture loss and forming small crystals, which do less damage to texture. Most often the IQF freezing process involves cryogenic gases (liquid nitrogen and liquid carbon dioxide). Additionally, the equipment is preferably tailored to the gas. Most of the cooling with nitrogen comes from the sensible heat, so the liquid is injected countercurrent to the product flow and warmed vapor is exhausted near the entrance of the typical tunnel. With carbon dioxide, the heat removal is by sublimation of the dry ice snow, so the liquid is injected concurrently with the food and vapor exhausted near the exit.

Cryogenic freezing is especially appealing when products are frozen before packaging and when weight loss is important, such as in the vegetable industry. IQF freezing provides uniformly frozen discrete particles of egg and avoids the formation of lumps. Lumps are the result of non-uniform freezing of the external product contact surfaces. Additionally the very low temperatures reduce moisture loss and so increase yield. The IQF freezing process also forms small ice crystals (i.e., not visually apparent by unmagnified visual examination), which provides enhanced quality.

The frozen precooked egg portions may be made from whole egg, egg white, egg yolk, or mixtures thereof. Additional ingredients, such as extenders, diluents, stabilizers, preservatives, seasonings, and flavorants may optionally be incorporated in the composition used to prepare the frozen precooked egg portions. Specifically contemplated additional ingredients include skim milk, soybean oil, modified food starch, salt, xanthan gum, flavors and citric acid. Examples of suitable compositions for use in making the frozen precooked egg portions are described in U.S. Pat. Nos. 6,759,076 and 7,069,844.

The precooked egg portions are from about 50% to about 85% by weight of the total scrambled egg composition. In an embodiment of the present invention, the precooked egg portions are from about 55% to about 70% by weight of the total scrambled egg composition.

The microwavable, refrigerated scrambled egg composition additionally comprises a pasteurized slurry comprising liquid egg and pregelatinized modified food starch.

The liquid egg component of the slurry may be made from whole egg, egg white, egg yolk, or mixtures thereof. Additional ingredients, such as extenders, diluents, stabilizers, preservatives, seasonings, and flavorants may optionally be incorporated in the composition used to prepare the frozen precooked egg portions. In a preferred embodiment, the liquid egg component of the slurry may be commercially available extended shelf life egg mixture compositions, such as Golden Nature™ egg mixture, commercially available from Cargill Incorporated.

The pasteurized slurry additionally comprises a pregelatinized modified food starch. A modified starch is a starch that has been treated to be partially degraded. Starch degradation treatments include acid, alkaline, bleaching, oxidation, and enzyme treatments. Starch sources include starch sources consisting of cereal, root, tuber and legume. starch sources consisting of wheat, waxy wheat, corn, waxy corn, high amylose corn, oat, rice, tapioca, mung bean, sago, sweet potato, potato, barley, triticale, sorghum and banana. See United States Patent 2006/0188631. In a preferred embodiment, the pregelatinized modified food starch is a modified tapioca starch. Tapioca starch is particularly advantageous because it has a mild flavor that has been found to be very complimentary to the egg flavors of the present scrambled egg composition.

Tapioca starch is preferred for use in egg products because of its superior very bland flavor, excellent paste clarity and good heat stability. The most significant attribute is the smooth and creamy texture, which provides the cling and adhesion to the IQF pre-cooked scrambled egg.

One variety of starch, Cargill CreamTex™ starch (commercially available from Cargill Incorporated), is a stabilized and cross-linked tapioca starch that requires heating (hence it is referred to as a "cook-up" starch) to achieve the optimum viscosity and cling.

Another variety of tapioca starch is stabilized, cross-linked and additionally processed to provide an instant starch commonly referred to as a cold water swelling starch. The starch provides instant viscosity without cooking (extremely quick hydration) and very high water binding capacity. For example, HiForm™ 72348 (commercially available from Cargill Incorporated) is a high performance cold water swelling starch with superior flavor and a high viscosity profile. Starches produced with this particular spray-cooking technology are uniformly cooked with a minimum amount of heat and shear damage. They exhibit many properties of premium cook-up tapioca starches, yet hydrate and develop high viscosity in the absence of heat.

In an embodiment of the present invention, the pasteurized liquid egg of the slurry is from about 40% to about 95% by weight of the slurry. In another embodiment of the present invention, the pregelatinized modified food starch is from about 3% to about 15% by weight of the slurry. In another embodiment of the present invention, the pregelatinized modified food starch is from about 5% to about 10% by weight of the slurry. The balance of the slurry composition preferably comprises a liquid having a flavor that is complementary to the egg composition, which liquid preferably is water. In an embodiment of the present invention, the slurry comprises added water in an amount of from about 30% to about 45% by weight of the slurry.

A representative preferred slurry composition consists essentially of about 52-56% whole egg, 36-40% water and 4-8% starch.

The slurry may have a viscosity of from about 1,000 to about 4,000 cps, and preferably has a viscosity of from about 2,000 to about 3,500 cps. If the viscosity exceeds about 4,000 cps the slurry will not adequately and uniformly cover the IQF pre-cooked scrambled egg. If the viscosity is less than about 1,000 cps., the creamy texture will be less noticeable since the slurry will not cling to the IQF pre-cooked scrambled egg. In both cases, the appearance, texture and sensory qualities will not match that of freshly prepared scrambled eggs. Viscosity measurements are determined with a Brookfield Viscometer Model DV-I+ with the #4 spindle at 60 rpm for 15 seconds. A minimum sample size of 400 ml. is required and the temperature of the sample ranges between 38° F. and 42° F.

In a preferred embodiment, the slurry and the frozen precooked egg portions both comprise one or more preservatives provided in an amount to achieve an estimated 10 week refrigerated shelf life.

The present microwavable, refrigerated scrambled egg composition may be manufactured using techniques that are readily adaptable to large scale production.

In an embodiment of the present invention, a process for preparing a scrambled egg composition is provided, comprising:

a) providing frozen precooked egg portions at least about 50% by weight of the frozen egg portions being pieces that are at least about ½ inch in one dimension;

b) preparing a slurry comprising pasteurized liquid egg and pregelatinized modified food starch, c) mixing the precooked egg portions and the slurry together to provide a scrambled egg composition.

In an embodiment of the present invention, all slurry components are combined prior to pasteurization. In another embodiment, liquid egg is pasteurized prior to mixing with the pregelatinized modified food starch.

In an embodiment of the present invention, the scrambled egg composition is deposited in individual portions after mixing the precooked egg portions and the slurry together. In another embodiment, the precooked egg portions and the slurry are deposited as two separate streams and packaged together to form the scrambled egg composition. In an embodiment of the present invention, the scrambled egg composition is provided in individual portions ranging from about 1.5 to about 3.5 ounces. In another embodiment, the scrambled egg composition is provided in "family size" portions ranging from about 3.5 to about 16 ounces or more.

The scrambled egg composition is preferably packaged in containers suitable for cooking the product directly in the container by microwave cooking. In an embodiment, the containers are suitable for cooking the product directly in the container by microwave, oven or steam heating. The container optionally may be a bag or in a sealed tray. Optionally the container is a sealed tray suitable for use both in cooking and in presenting the cooked product to the ultimate consumer for eating. Preferably, the container is a self-venting microwave oven package. In a preferred embodiment, the container is self-venting and provides sufficient headspace that when the scrambled egg composition is cooked in the microwave, a substantial component of the cooking process is carried out by self-generated steam heat. It has been discovered that when the scrambled egg composition is heated in the microwave oven in such a container, the self-venting package provides an especially evenly heated, moist scrambled egg portion.

Typically, heating a small portion of a conventional scrambled egg in the microwave oven creates drying and a tough texture, particularly on the perimeter of the package. Reheating the present scrambled egg composition, particularly in a self venting package, in the microwave oven allows the product to heat with steam that is circulated within the individual portion. The optimum headspace in a 3.5 oz. individual portion is about ½ inch on average. Since the egg portions are primarily heated with steam instead of microwave energy, the portions retain the desired appearance, tender texture and mouthfeel, and fresh sensory profile.

Examples of self-venting microwave oven packages are known, such as disclosed in U.S. Pat. Nos. 4,013,798; 4,141,487; 4,404,241; 4,390,554; 4,640,838; and U.S. Pat. No. 7,034,268.

As noted above, the scrambled egg composition of the present invention is advantageously a refrigerated product, and therefore in the ordinary course of use the scrambled egg composition is held under refrigeration conditions for all times between manufacture and use by the consumer who heats the product for consumption. In an embodiment of the present invention, the scrambled egg composition is stored under refrigeration conditions for a period of at least 96 hours prior to cooking.

In a preferred embodiment the microwavable, refrigerated scrambled egg composition is heated after refrigeration storage by microwave. Optionally, the egg composition is heated after refrigeration storage by other cooking techniques, such as steam heat (including heating in a pressure cooker, steam cabinet or on a steam table), water heat (e.g. placing a bag in hot or boiling water), conventional or convection oven heat, and the like.

EXAMPLES

Representative embodiments of the present invention will now be described with reference to the following examples that illustrate the principles and practice of the present invention.

Example 1

600 Grams of a fully cooked egg formulation was sliced into randomly sized pieces and quick frozen in an environment of liquid $CO_2$ by rapid agitation in a partially closed container. The irregularly shaped and randomly sized pieces were collected such that approximately 75% of the pieces were at least ½ inch in the three dimensions of length, width and height. Not more than 5% of randomly sized egg pieces would pass through a U.S. standard No. 7 sieve screen with a nominal sieve opening of 2.8 mm.

400 Grams of the liquid portion of the scrambled egg composition was prepared and mixed for a period of 3 minutes with the low setting of the KitchenAid mixer (Model number K5SSWW). The liquid portion was comprised of the following: whole eggs (231.84 grams), water (151.84 grams), Cargill CremTex™ modified tapioca starch (16 gram), citric acid (0.32 grams). All components of the liquid portion were mixed in a high speed Waring blender (Model number 33BL79 (700)) for a period of three minutes. The homogeneous mixture was pasteurized according to the requirements of the U.S.D.A. Immediately after pasteurization, the mixture was cooled to a temperature of 38 degrees F. The viscosity of the mixture was 2,500 cps when measured with a Brookfield viscometer. This viscosity provides the cling and adhesion to the IQF egg pieces required to appear freshly made.

The collected fully cooked egg formulation and the pasteurized "liquid portion" were combined in a KitchenAid mixer using the paddle mixing attachment. The resulting mixture was deposited into a flexible, formable co-extruded web packaging. The high oxygen barrier properties of the packaging provide a long shelf life. A similar high barrier flexible non-formable web is sealed onto the formable web using a Multi-Vac packaging system. An irregularly shaped die is used to provide an attractive, appealing portion. Additionally, air is evacuated from the package and a mixture of 40% carbon dioxide and 60% nitrogen is back flushed into the portions. The flexible non-forming web has a score, which allows the steam to escape when the package is re-thermalized in the microwave oven. The self-venting package provides an evenly heated, moist scrambled egg portion.

Numerous flexible non-formable web and formable web materials are commercially available. Typically, they are comprised of multi-layer film construction utilizing multiple proprietary polymers. Oxygen Transmission Rates (OTR) and Moisture Vapor Transmission Rate (MVTR) are critical measures that define barrier properties. OTR is typically measured in cubic centimeters per 100 square inches per 24 hours. Typically values range from about 11.0 to about 0.2. MVTR is typically measured as grams of water per 100 square inches per 24 hours. Typically values range about 0.7 to about 0.13. In the preferred embodiment, the protective packaging film has oxygen barrier properties (OTR) of <0.3 cubic centimeter per 100 square inches per 24 hours at 73° F. and 0% relative humidity. Additionally, in the preferred embodiment, the MVTR is <0.4 grams water per 100 square inches per 24 hours at 100° F. and 90% relative humidity.

The depth of the package is adjusted so that the headspace in the 3.5-ounce individual portion averaged ½". The ½" headspace allows the steam generated during re-thermalization to uniformly heat the product without drying the surface or the edges of the package contents. Since the egg portions are heated with steam instead of microwave energy, the portions retain the desired appearance, tender texture and mouthfeel and fresh sensory profile.

The product provided in a microwavable tray package of this Example 1 is shown in the photograph of FIG. 1.

Example 2

The procedure described in Example 1 above was used to prepare an alternative embodiment, except that the fully cooked egg portion and the pasteurized liquid portion are deposited in a dual film package using a weight control filler system, rather than the KitchenAid mixer. Specifically, 2.1 ounces of fully cooked scrambled egg and 1.4 ounces of pasteurized liquid portion are separately deposited into the dual film package, resulting in a total weight of 3.5-ounce portion of a microwavable, refrigerated scrambled egg composition.

Figure 2:
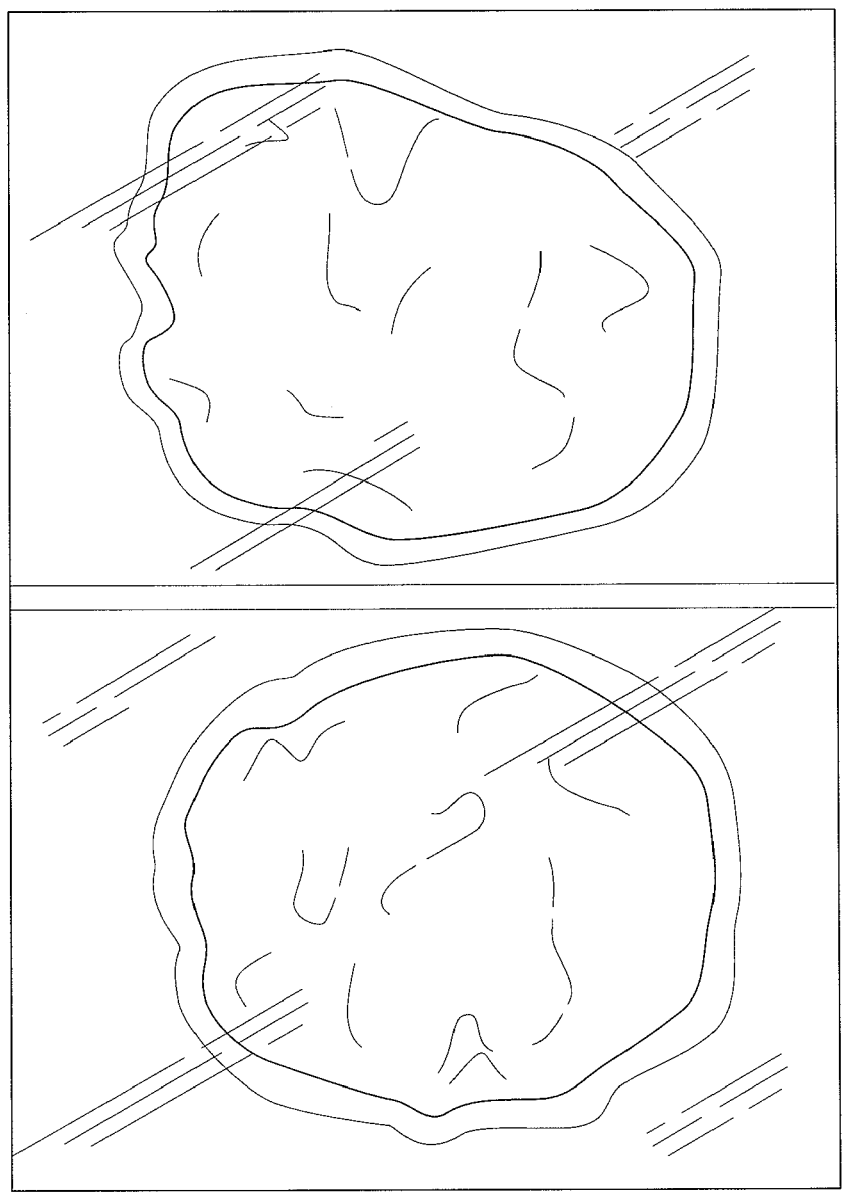
FIG. 2 is photograph of an egg product provided in a microwavable package.

The product provided in a microwavable package of this Example 2 is shown in the photograph of FIG. 2.

Figure 3:
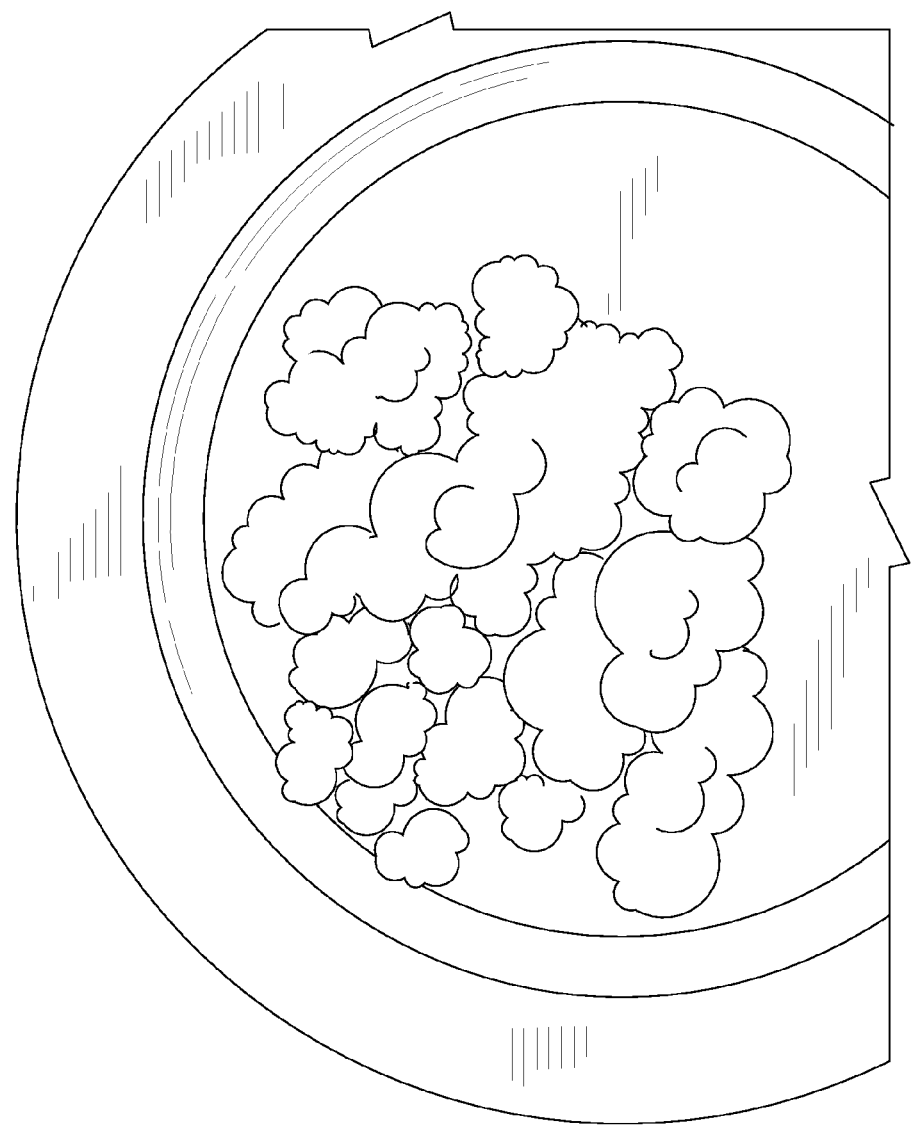
FIG. 3 is photograph of an egg product after being cooked in a microwave.

This package is heated in a microwave oven for a time sufficient to heat the egg product, and the contents of the package are placed on a plate, ready for consumption, as shown in FIG. 3.

All patents, patent applications (including provisional applications), and publications cited herein are incorporated by reference as if individually incorporated for all purposes. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A microwavable, refrigerated scrambled egg composition, comprising:
   a) frozen precooked egg portions, at least about 50% by weight of the frozen egg portions being pieces that are at least about ½ inch in one dimension; and
   b) a slurry comprising pasteurized liquid egg and pregelatinized modified food starch;
   wherein the precooked egg portions are from about 50% to about 85% by weight of the total scrambled egg composition and the slurry is from about 15% to about 50% by weight of the total scrambled egg composition.

2. The scrambled egg composition of claim 1, wherein the slurry has a viscosity of from about 2,000 to about 3,500 cps.

3. The scrambled egg composition of claim 1, wherein the frozen egg portions have a smallest dimension, and at least about 50% by weight of the frozen egg portions being pieces that are at least about ½ inch in the smallest dimension.

4. The scrambled egg composition of claim 1, wherein the frozen egg portions have a smallest dimension, and least about 50% by weight of the frozen egg portions being pieces that are from about ½ inch to about 1 inch in the smallest dimension.

5. The scrambled egg composition of claim 1, wherein the frozen egg portions have a smallest dimension, and least about 75% by weight of the frozen egg portions being pieces that are from about ½ inch to about 1 inch in the smallest dimension.

6. The scrambled egg composition of claim 1, wherein less than about 5% by weight of the frozen precooked egg portions are provided by pieces small enough to pass a #7 screen.

7. The scrambled egg composition of claim 1, wherein the frozen egg portions are non-uniform in size and shape.

8. The scrambled egg composition of claim 1, wherein the frozen egg portions are quick frozen.

9. The scrambled egg composition of claim 1, wherein the pasteurized liquid egg of the slurry is from about 40% to about 95% by weight of the slurry.

10. The scrambled egg composition of claim 1, wherein the pregelatinized modified food starch is from about 3% to about 15% by weight of the slurry.

11. The scrambled egg composition of claim 1, wherein the pregelatinized modified food starch is from about 5% to about 10% by weight of the slurry.

12. The scrambled egg composition of claim 1, wherein the pregelatinized modified food starch is tapioca starch.

13. The scrambled egg composition of claim 1, wherein the scrambled egg composition is provided in a self-venting microwavable package.

14. The scrambled egg composition of claim 13, wherein the microwavable package is irregularly shaped, so that the resulting scrambled egg product after cooking is in the form of non-uniform portions.

15. The scrambled egg composition of claim 1, additionally comprising non-egg food inclusions selected from the group consisting of meat, cheese, and vegetables and mixtures thereof.

16. The scrambled egg composition of claim 15, wherein the non-egg food inclusions are incorporated in the frozen precooked egg portions.

17. A process for preparing the scrambled egg composition of claim 1, comprising:
   a) providing frozen precooked egg portions at least about 50% by weight of the frozen egg portions being pieces that are at least about ½ inch in one dimension;
   b) preparing a slurry comprising pasteurized liquid egg and pregelatinized modified food starch,
   c) mixing the precooked egg portions and the slurry together to provide a scrambled egg composition of claim 1.

18. The process of claim 17, wherein all slurry components are combined prior to pasteurization.

19. The process of claim 17, wherein liquid egg is pasteurized prior to mixing with the pregelatinized modified food starch.

20. The process of claim 17, wherein the scrambled egg composition is deposited in individual portions after mixing the precooked egg portions and the slurry together.

21. The process of claim 17, wherein the precooked egg portions and the slurry are deposited as two separate streams and packaged together to form the scrambled egg composition.

22. The process of claim 17, further comprising the step of storing the resulting scrambled egg composition under refrigeration conditions for a period of at least 96 hours prior to cooking.

* * * * *